G. W. EMMERT.
LICENSE PLATE HOLDER.
APPLICATION FILED JUNE 7, 1919.
1,340,387.
Patented May 18, 1920.
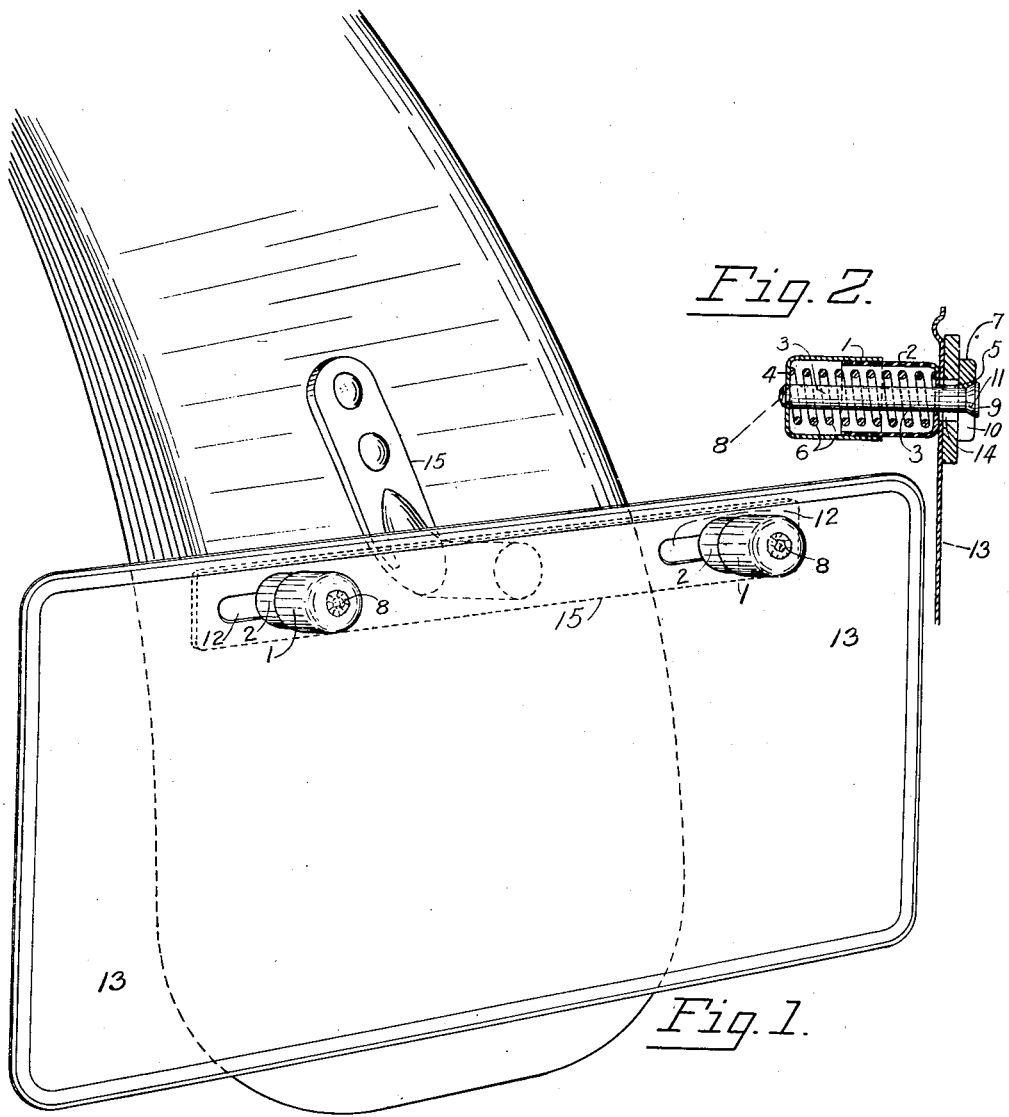
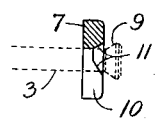
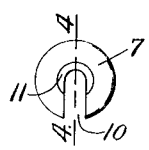
INVENTOR.
George W. Emmert
by William B. Wharton
his attorney

UNITED STATES PATENT OFFICE.

GEORGE W. EMMERT, OF PITTSBURGH, PENNSYLVANIA, ASSIGNOR TO THE CLAMERT MANUFACTURING COMPANY, OF PITTSBURGH, PENNSYLVANIA, A CORPORATION OF DELAWARE.

LICENSE-PLATE HOLDER.

1,340,387.   Specification of Letters Patent.   Patented May 18, 1920.

Application filed June 7, 1919. Serial No. 302,490.

*To all whom it may concern:*

Be it known that I, GEORGE W. EMMERT, a citizen of the United States, and resident of Pittsburgh, Allegheny county, Pennsylvania, have invented a new and useful Improvement in License-Plate Holders, of which the following is a specification.

This invention relates to a holder for automobile license plates.

The object of the invention is to provide a license plate holder which is simple in construction, is readily applied to or removed from position for securing the plate to its supporting bracket, and which holds it firmly without too great a degree of rigidity. Further and more special objects of the invention are to provide a license plate holder which will secure the plate to a bracket having orifices of any shape therein, and one which cannot be accidentally jarred loose or into any position which may cause the plate to be loosened or disengaged from the bracket.

In the accompanying drawings, Figure 1 is a perspective view of the device showing it in operative position for securing a license plate to its bracket; Fig. 2 is a longitudinal section through the device; Fig. 3 is a plan of the retaining plate employed; and Fig. 4 is a section therethrough on the line 4—4, Fig. 3.

The license plate holder comprises a casing or barrel 1, a second barrel 2, fitting and slidable within the barrel 1, a shank 3, secured to the head 4 of the barrel 1 and extending through the head 5 of the barrel 2, a coiled spring 6 surrounding said shank and bearing against the inner surface of the head of each of said barrels, and a retaining plate 7 arranged to engage with the shank 3.

The shank 3 is rigidly secured at one extremity to the head of the barrel 1, as by the rivet 8, and has at its other extremity a locking head 9, which is of moderate size and which lies beyond the head 5 of the barrel 2. The retaining plate 7 is provided with a slot 10 arranged to permit the head to be slipped onto the shank 3, and a countersunk seat 11 arranged to receive the head 9 of the shank.

In applying the holder to secure a license plate to a bracket, pressure is applied to the head 4 of the barrel 1 so that it slides over the barrel 2 and compresses the spring 6. The shank 5 is thus caused to project beyond the head of the barrel 2, and may be inserted through the slot or other orifice 12 in the plate 13 and through the bolt hole or other orifice 14 in the bracket 15 to project a reasonable distance beyond the latter. The retaining plate 7 is then slipped over the shank 3 so that the locking head 9 is in line with the counter-sunk seat 11. By merely releasing the pressure on the barrel 1, the tension of the coiled spring 3 will tend to force the barrels 1 and 2 apart as far as the length of the shank 3 will permit. The plate and bracket are thus held securely between the head 5 of the barrel 2 and the retaining plate 7, and the locking head 9 is secured in the countersunk seat 11.

Because of the relatively small size of the locking head 9 on the shank it can be introduced through either slots or bolt holes in the license plate and bracket, it being necessary to have merely a small registering space between the two apertures. Because, moreover, of the size and shape of the retaining plate 7, it will hold the license plate securely in place whether bolt holes or slots be provided in the bracket.

In order to disengage the license plate from the bracket, the spring 3 is again compressed, thus relieving the pressure holding the retaining plate 7 against the bracket 15 and disengaging the locking head 9 from the seat 11. The plate 7 can then be removed from the shank 3 and the shank 3 itself withdrawn through the registering apertures in the bracket and license plate.

In prior devices for the same purpose a rotatable retaining head, set at right angles to the license plate and bracket, has been attached rigidly to the shank of the holder. The retaining head is thus inserted through registering slots in the license plate and bracket and rotated into such position that it will not be withdrawn through the slots. The use of such a device, however, is greatly limited because a relatively small number of the brackets are provided with slots through which such a retaining head may be inserted. In other devices, in which the retaining member is formed separate from the body of the device, independent locking means for the retaining member have necessarily been provided in order that the holder may not become disengaged during its use by jarring or other causes.

The present device is so designed that it may be used to secure license plates to brackets which have therein apertures of varying form, and by merely increasing the size of the retaining plate may be used where such apertures are of any desired size. The means for locking the parts in position are simple and require no special operation in order to effectually lock the device against accidental displacement.

Although the device is described as being used for one purpose, namely for securing automobile license plates in position on automobiles, it is susceptible of a wide variety of uses. Thus it may be employed to secure small signs of any sort, such as advertisements or street car or railway signs, in place. In any such case it presents the advantages that it can be readily applied and removed from position, and cannot be dislodged by jolts or jars.

What I claim is;

1. A device for securing plates to brackets comprising a shank having a terminal portion of substantially uniform diameter and an enlarged head on said terminal adapted to pass through registering apertures of various shapes in such plates and brackets without requiring a special position of the shank about its axis, spring means to be compressed when said head is passed through said openings; and a retaining member, engageable on the terminal of the shank projecting through said apertures and slidable longitudinally thereon, for said enlarged head to seat against under the tension of said spring means.

2. A device for securing plates to brackets comprising a shank having a head adapted to pass through registering openings of various shapes in such plates and brackets without requiring a special position of the shank about its axis, spring means on said shank to be compressed when said head is passed through said openings, a slotted retaining member slidable onto the shank and having a seat to receive said head under tension of the spring means, and prevent lateral displacement of said member from said shank.

In witness whereof I have hereunto set my hand.

GEORGE W. EMMERT.

In the presence of—
 RAYMOND H. DUFF,
 FLORENCE F. SCHWARTZ.